United States Patent [19]

Takahashi

[11] Patent Number: 5,037,361
[45] Date of Patent: Aug. 6, 1991

[54] TRACTION TYPE TRANSMISSION

[76] Inventor: Takashi Takahashi, 26-18, Kamisoshigaya 1, Setagaya-ku, Tokyo, Japan

[21] Appl. No.: 635,029

[22] Filed: Dec. 28, 1990

[30] Foreign Application Priority Data

Oct. 12, 1990 [JP] Japan .................................. 2-272141

[51] Int. Cl.⁵ ............................................ F16H 13/00
[52] U.S. Cl. ................................ 475/195; 475/183; 74/216; 74/208
[58] Field of Search ................ 475/183, 195; 74/206, 74/208, 216

[56] References Cited

U.S. PATENT DOCUMENTS

| 3,211,262 | 10/1965 | Hoffstrom | 475/183 X |
| 3,367,214 | 2/1968 | Nasvytis | 475/183 |
| 3,793,907 | 2/1974 | Nakamura et al. | 475/195 X |
| 4,060,010 | 11/1977 | Heden | 475/183 |

Primary Examiner—Dirk Wright
Attorney, Agent, or Firm—Armstrong, Nikaido, Marmelstein, Kubovcik & Murray

[57] ABSTRACT

A traction type transmission characterized in that a planetary roller mechanism is constituted by a sun roller, a plurality of planetary rollers disposed equidistantly around the sun roller and an exterior ring disposed outside the planetary rollers, the sun roller is connected to a high speed shaft while either the exterior ring or the planetary shafts of the planetary rollers are connected to a low speed shaft through a rotary member; the planetary rollers are strongly pressed to the outer periphery of the sun roller in the presence of an oil and two slope surfaces of the inner periphery of the exterior ring are strongly pressed to both shoulder portions of the outer periphery of these planetary rollers in the presence of an oil, respectively.

5 Claims, 7 Drawing Sheets

TRACTION TYPE TRANSMISSION

BACKGROUND OF THE INVENTION

This invention relates to a traction type transmission having a high speed change ratio, and more particularly to a traction type transmission capable of transmitting smoothly power of ultra-high speed revolution as high as tens of thousands of revolutions per minute at a high speed change ratio.

Recent transmissions for gas turbines or blowers are required to be able to change the speed of power of ultra-high speed revolution as high as 30,000–45,000 r.p.m. It is known, however, that various difficulties are encountered when such an ultra-high speed revolution is changed by transmission gears. This is because lubrication of a tooth surface cannot be made sufficiently and the occurrence of a machining error of the gears is unavoidable, and the machining error increases vibration with an increasing speed of revolution and consequently, transmission of the ultra-high speed revolution becomes extremely dangerous.

In order to prevent defects of such ultra-high speed revolution, various counter-measures such as correction of the gear profile after machining, the use of a very expensive bearing for ultra-high speed revolution, improved lubrication methods and the like are necessary in addition to mere precision machining of the gears. However, the apparatus will become extremely expensive if all of these requirements are satisfied.

SUMMARY OF THE INVENTION

It is an object of the present invention to provide a traction type transmission which overcomes the problems encountered when ultra-high speed revolution is transmitted by transmission gears.

It is another object of the present invention to provide a traction type transmission capable of smoothly changing high speed power by employing a so-called "traction system".

It is still another object of the present invention to provide a traction type transmission capable of changing ultra-high speed power as high as tens of thousands of revolutions per minute smoothly and moreover, in one action at a high speed change ratio.

According to the recent studies on tribology, particularly the studies of elastohydrodynamic lubrication, it is known that if an extreme pressure is applied between two surfaces coming into mutual contact in the presence of a specific lubricating oil, the coefficient of friction increases instantaneously two to three times. "Santotrac" (trade name), a product of Nippon Sekiyu K. K., for example, is proposed as a lubricating oil suitable for such an operation.

The present invention accomplishes the objects described above by applying such a tribology theory to a planetary roller mechanism having a specific structure.

In other words, the present invention for accomplishing the objects described above is characterized in that a planetary roller mechanism is constituted by a sun roller, a plurality of planetary rollers disposed equidistantly around the sum roller and exterior rings disposed outside the planetary rollers; each of the planetary rollers is divided concentrically into a roller portion on a planetary shaft side and a ring portion on the outer periphery side with a gap between them; the ring portion is pressed strongly to the outer periphery of the sun roller in the presence of an oil; and two slope surfaces of the inner periphery of the exterior ring are pressed strongly to both shoulder portions of the ring portion in the presence of an oil.

Further preferably, the ring portion of each planetary roller is molded in a stepped shape having a larger outer diameter portion and smaller outer diameter portions on both right and left sides of the larger outer diameter portion, the larger outer diameter portion is pressed strongly to the outer periphery of the sun roller in the presence of an oil and the two slope surfaces of the inner periphery of the exterior ring are pressed strongly to the outer periphery of the smaller outer diameter portions on the right and left sides in the presence of an oil, in order to make transmission possible at a higher speed change ratio.

The planetary roller mechanism in the present invention includes the case of a so-called "star type" where the planetary rollers are not permitted to revolve but the exterior rings are connected to a high speed shaft and are permitted to revolve, and the case of a so-called "planetary type" where the exterior rings are not permitted to revolve but the planetary rollers are connected to the high speed shaft and are permitted to revolve.

The apparatus of the present invention brings the sun roller and the planetary rollers into mutual contact and the planetary rollers and the exterior rings into mutual contact in the presence of an oil, respectively, generates a large frictional force in accordance with the tribology theory by applying an extreme pressure between them, respectively, and generates a large traction force. Since each planetary roller is divided concentrically into the roller portion on the planetary shaft side and the ring portion on the outer periphery side through a gap between them, influences of the pressing force to the planetary shafts can be eliminated completely.

Furthermore, each planetary roller is shaped to include the larger outer diameter portion and the smaller outer diameter portions, the larger outer diameter portion is pressed strongly to the sum roller and the exterior ring is pressed strongly to the smaller outer diameter portions. Accordingly, a large speed change ratio can be obtained at a stroke.

The inner peripheral surface of the exterior ring, which is brought into pressure contact with the smaller outer diameter portions of the planetary roller, is molded in the slope surface, and can therefore generate a large extreme pressure due to the wedge action. In this case, the smaller outer diameter portions, too, are molded in the slope surface and more preferably, they are machined to the crowned surface. Means for generating the pressing force in a radial direction to the exterior ring is not particularly limitative. One of them utilizes a hydraulic mechanism or a spring mechanism and another utilizes thermal shrinkage force.

In order to utilize the former, that is, the hydraulic mechanism, one of the right and left exterior rings is fixed to a casing, while the other is constituted as a hydraulic piston and is idly fitted into a hydraulic cylinder in such a manner as to be capable of moving freely in an axial direction. In the case of this hydraulic mechanism, the pressing force between the exterior ring and the planetary roller and between the planetary roller and the sun roller can be changed by regulating the oil pressure of the hydraulic cylinder in accordance with the load. Accordingly, a maximum pressing force need not be applied always and for this reason, durability of the apparatus can be improved.

The means which utilizes the latter, that is, thermal shrinkage force, employs the structure wherein the inner diameter at the contact portion of the inner periphery surface of the exterior ring is made somewhat smaller than the diameter at the contact portion of a circumscribed circle with respect to the smaller diameter portions of a plurality of planetary rollers, and this exterior ring is heated and expanded and then fitted over the outer periphery of the smaller outer diameter portions and is thereafter cooled to normal temperature for shrinkage. The thermal shrinkage force at this time generates the pressing force acting on the planetary roller in the radial direction towards the axis of the sun roller.

The transmission of the present invention does not use a gear mechanism but is fundamentally constituted by a roller mechanism. Accordingly, machining must be carried out merely in order to secure perfectness of roundness and flatness (surface coarseness) of the rollers. Therefore, unlike machining of the profile of the gears, the occurrence of machining error is extremely less and vibration control for the ultra-high speed revolution can be restricted easily.

A plurality of planetary rollers are disposed but preferably, at least three planetary rollers are disposed equidistantly around the sun roller. If the outer periphery of the sun roller is pressed by at least three planetary rollers, the high speed shaft connected to the sun roller is inevitably positioned to the center, and the use of bearings for ultra-high speed revolution which is most troublesome and difficult in the case of transmission gears can be eliminated completely.

Each planetary roller is divided concentrically into two segments, that is, the roller portion on the planetary shaft side and the ring portion on the outer periphery side, with a gap between them. According to such a structure of the planetary roller, when the pressing force is applied from the exterior rings to the planetary rollers, the pressing force is prevented from acting on the planetary shaft but is permitted to act directly on only the sun roller, so that a high extreme pressure can be generated efficiently. Since an oil film exists in the gap between the two portions, it is helpful to absorb vibration.

DETAILED DESCRIPTION OF THE PREFERRED EMBODIMENTS

Figure 1:
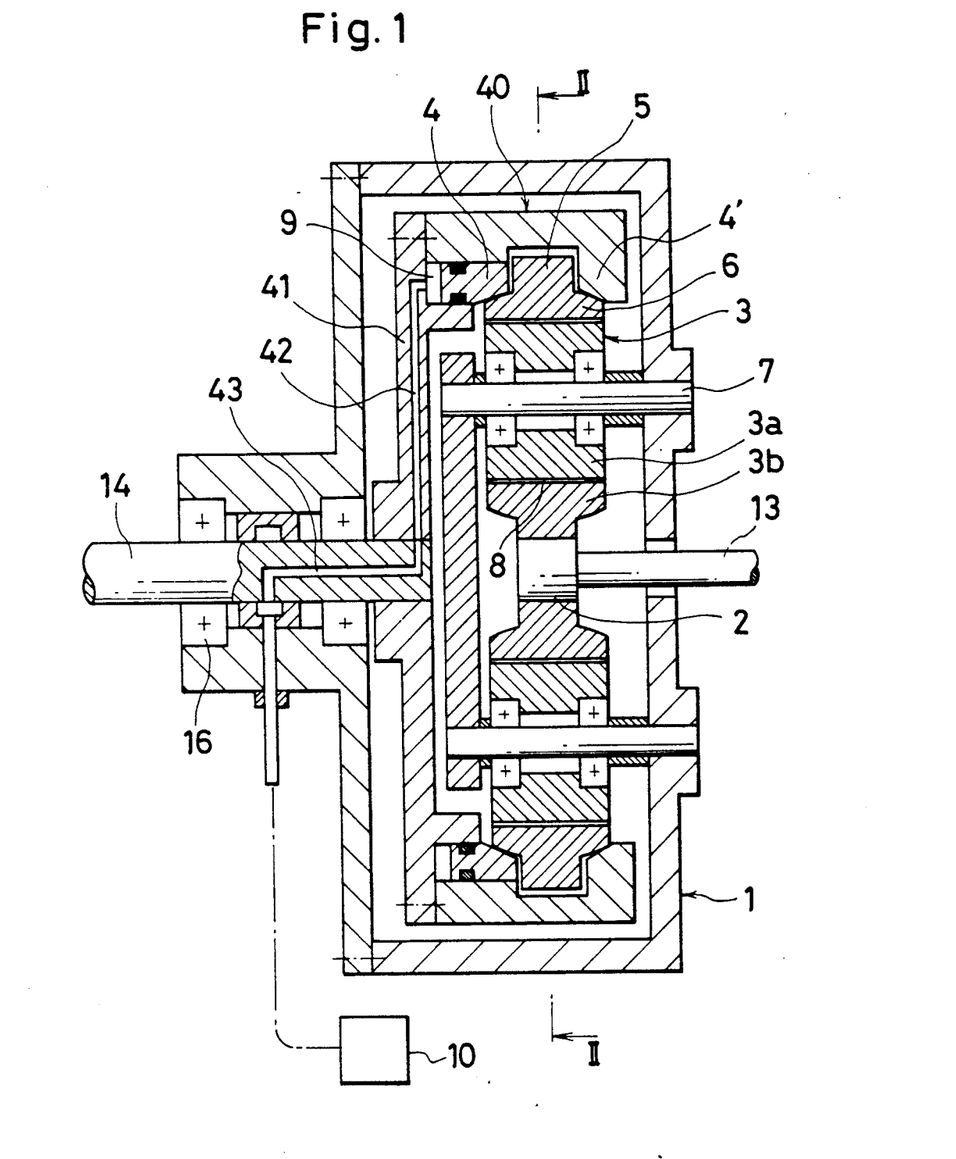
FIG. 1 is a sectional view showing a transmission in accordance with an embodiment of the present invention and taken along line I—I represented by arrows in FIG. 2.
Figure 2:
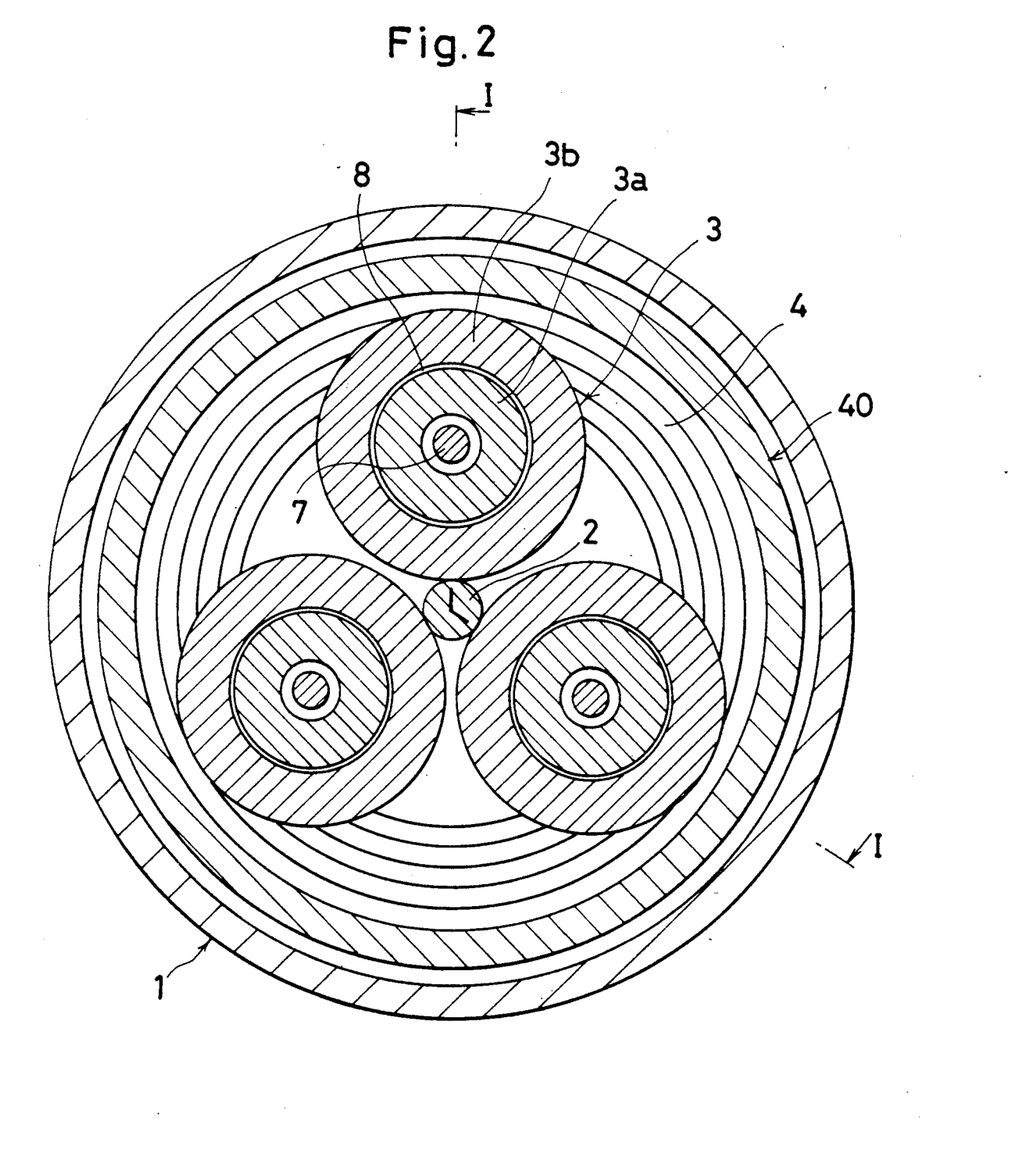
FIG. 2 is a sectional view of the transmission taken along line II—II represented by arrows in FIG. 1.

The embodiment shown in FIGS. 1 and 2 represents an example of the traction type transmission wherein its planetary roller mechanism is of a star type.

A sun roller 2 connected to a high speed shaft 13 is disposed at the center of a casing 1. Three planetary rollers 3 are disposed equidistantly around the outer periphery of this sun roller 2 and an exterior ring portion 40 having a pair of right and left exterior rings 4, 4' is disposed further outside and around the planetary rollers 3, and is connected to a low speed shaft 14 through a rotary plate 41. In this manner, the star type planetary roller mechanism is constituted.

In this planetary roller mechanism, each planetary roller 3 is divided into two segments, i.e. a roller portion 3a on the center side which is supported rotatably by a planetary shaft 7 and a ring portion 3b on the outer peripheral side and moreover, a gap 8 is defined between the roller portion 3a and the ring portion 3b. The planetary shaft 7 is fixed to the casing 1. The ring portion 3b of each planetary roller 3 is molded in a stepped form so as to include a larger outer diameter portion 5 and smaller outer diameter portions 6 and the small outer diameter portions 6 are disposed on the right and left sides of the large outer diameter portion 5.

The larger outer diameter portion 5 of the planetary roller 3 is brought into pressure contact with the sun roller 2 while interposing an oil between them. The exterior rings 4, 4' of the exterior ring portion 40 are brought into pressure contact with the right and left small outer diameter portions 6, 6 while interposing the oil on the slope surface on the inner periphery of the exterior rings 4, 4'. The outer peripheral surface of the larger outer diameter portion 5 is shaped in a cylindrical form which is parallel to the axial direction but the outer periphery of each smaller outer diameter portion 6 is shaped in the slope surface whose radius decreases progressively towards both exterior sides in the axial direction and is more preferably subjected to crowning. Those oils whose coefficient of friction increases instantaneously by an extreme pressure, such as "Santotrac" described already, are used as the oil to be interposed between the rollers.

On the other hand, the pressure contact surface on the inner periphery of each exterior ring 4, 4' is a tapered slope surface. One 4' of the exterior rings is formed integrally with the exterior ring portion 40 but the other 4 is formed as a hydraulic piston of a hydraulic mechanism and is fitted idly and slidably in the axial direction to a ring-like cylinder 9 formed between the exterior ring portion 40 and a rotary plate 41. This hydraulic piston 4 (exterior ring) is checked from rotation inside the ring-like cylinder 9 but is permitted to reciprocate only in the axial direction. In this manner, the exterior rings 4, 4' rotate integrally with the rotary plate 41 and with the low speed shaft 14.

The cylinder 9 communicates with a hydraulic source 10 through oil passages 42 and 43 which penetrate through the rotary plate 41 and the low speed shaft 14. The hydraulic piston of the exterior ring 4 moves in the axial direction towards the planetary roller 3 by the operation oil supplied from this hydraulic source 10 and clamps the ring portion 3b of the planetary roller 3 between it and the exterior ring 4'. The clamp action of these exterior rings 4, 4' and the wedge action of the slope surfaces of their inner periphery push strongly the planetary roller 3 towards the axis of the sun roller 2.

The high speed shaft 13 as an input shaft is coupled to the sun roller 2 and the sun roller 2 is positioned by the three planetary rollers 3. Accordingly, the high speed shaft 13 is connected to a prime mover such as a gas turbine, not shown in the drawing, without being supported by a bearing. On the other hand, the low speed shaft 14 as an output shaft is supported by a bearing 16 and is coupled to the load such as a generator, not shown in the drawing.

When the ultra-high speed revolution is transmitted from the high speed shaft 13 to the low speed shaft 14 at a reduced speed in the transmission described above, the operation oil of the hydraulic source 10 is supplied to the hydraulic cylinder 9 and the hydraulic piston 4 is moved in the axial direction towards the planetary roller 3. Due to this operation, the exterior rings 4, 4' on both right and left sides clamp the outer small diameter portions 6, 6 of the three planetary rollers 3 on the slope surfaces of their inner periphery and the wedge action at this time pushes strongly the planetary rollers 3 to the sun roller 2. This strong pressure generates an extreme pressure at the contact portions between the exterior rings 4, 4' and the small outer diameter portions 6, 6 of the planetary rollers 3 and at the contact portions between the larger outer diameter portions 5 of the planetary rollers 3 and the sun roller 2. Therefore, large frictional force develops instantaneously in the presence of the oil and large traction force is generated.

Figure 7:
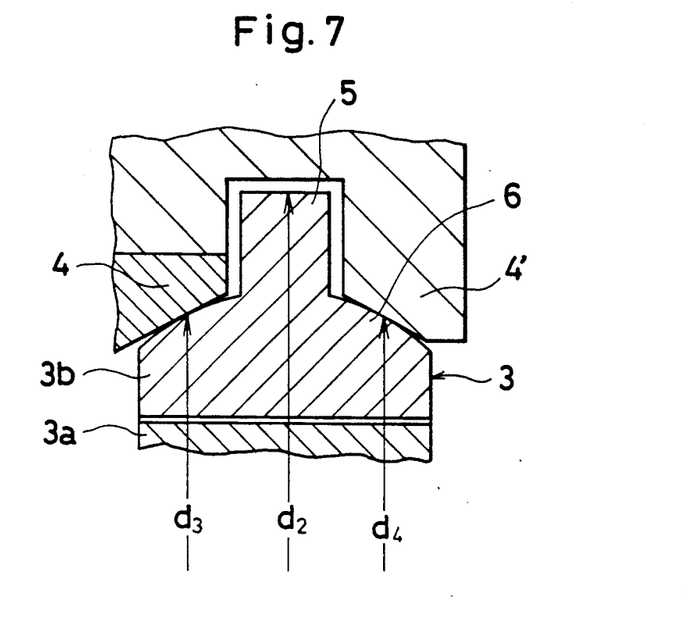
FIG. 7 is an explanatory view useful for explaining the diameters of components of the principal portions of the transmission of the present invention.

The sun roller 2 is in contact with the larger outer diameter portion 5 of each planetary roller 3 and the exterior rings 4, 4' are in contact with the smaller outer diameter portions 6 having a smaller diameter than the larger outer diameter portion 5. Accordingly, the power of the ultra-high speed revolution is transmitted from the high speed shaft 13 to the low speed shaft 14 at an extremely high reduction ratio. The reduction ratio R at this time is given by the formula below, wherein $d_1$ is the diameter of the sun roller 2, $d_2$ is the diameter of the larger outer diameter portion of the planetary roller, $d_3$ is the diameter at the contact portion of the smaller outer diameter portion 6 and $d_4$ is the diameter at the contact portion of the exterior rings 4, 4' (see FIG. 7);

$$R = d_1 \cdot d_3 / d_2 \cdot d_4$$

In the transmission described above, each planetary roller 3 is divided into the roller portion 3a and the ring portion 3b and the gap 8 is defined between them. Accordingly, the push force applied from the exterior rings 4, 4' in the radial direction is caused to act directly on the outer peripheral surface of the sun roller 2 through the ring portion 3b without being applied to the roller portion 3a and the planetary shaft 7.

Figure 3:
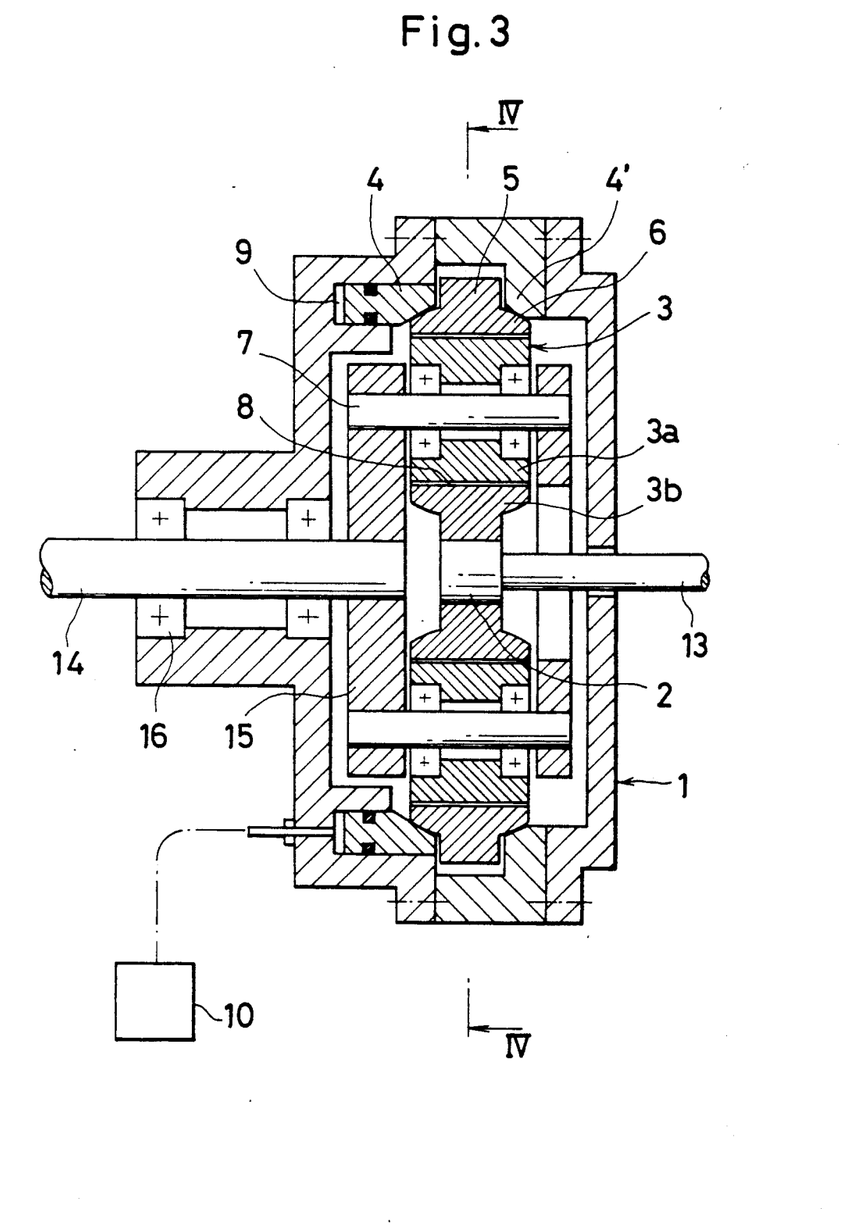
FIG. 3 is a sectional view showing the transmission in accordance with another embodiment of the present invention and taken along line III—III represented by arrows in FIG. 4.
Figure 4:
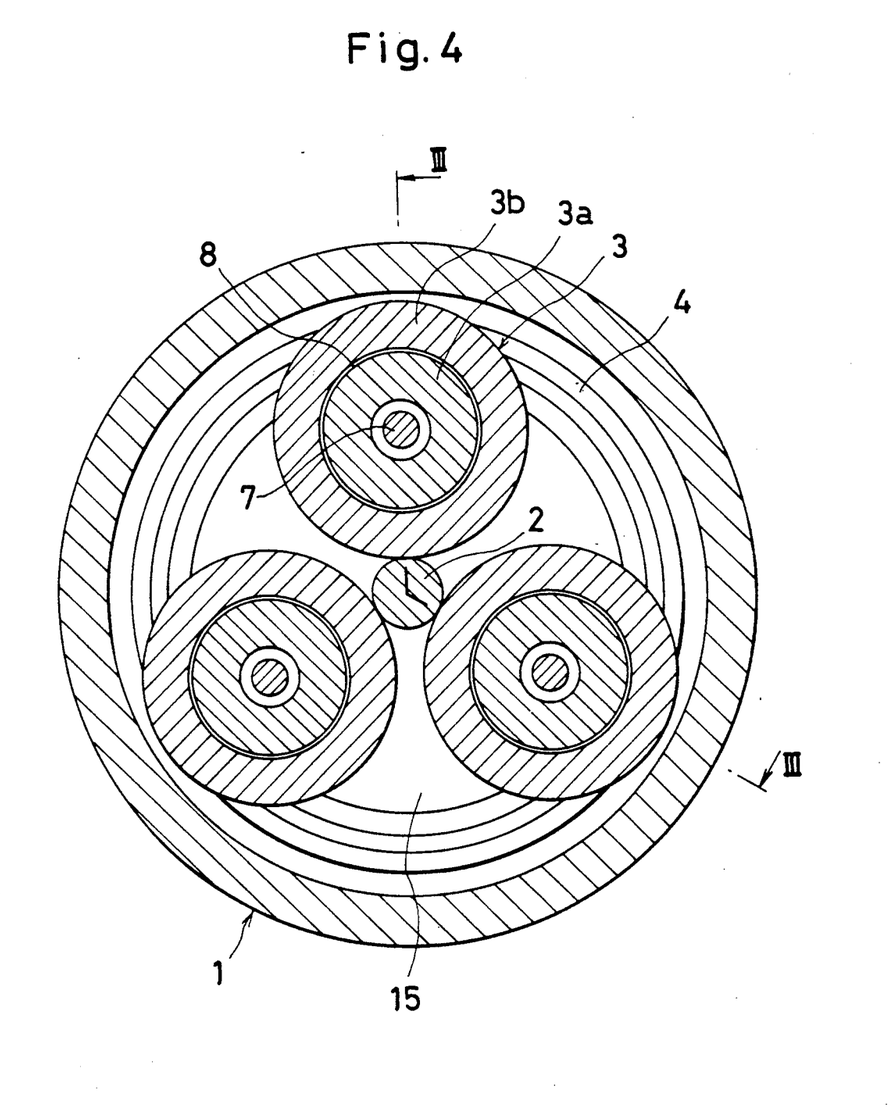
FIG. 4 is a sectional view of the transmission taken along line IV—IV represented by arrows in FIG. 3.

FIGS. 3 and 4 show another embodiment of the present invention.

In this embodiment, the planetary roller mechanism is not of the star type but is of the planetary type and only this point is different from the first embodiment with the rest being substantially the same. In other words, the planetary shaft 7 is coupled to the low speed shaft 14 through a carrier 15 so as to revolve the planetary roller 3, and the exterior rings 4, 4' are inhibited from rotation.

In this transmission, too, an extreme pressure is generated in the presence of the oil between the sun roller 2 and the planetary roller 3 and between the planetary roller 3 and the exterior rings 4, 4', and large frictional force is generated in accordance with the tribology theory. Since the planetary roller 3 is divided concentrically into the roller portion 3a on the planetary shaft side and the ring portion 3b on the outer peripheral side through the gap 8, the effect of not applying the influences of the pressure contact force to the planetary shaft 7 is the same as in the case of the first embodiment.

In this second embodiment, too, the larger outer diameter portion 5 and the smaller outer diameter portions 5 are disposed on the planetary roller 3 and for this reason, a high transmission ratio (reduction ratio) R can be obtained in one stage. This reduction ratio R can be calculated easily in the following way.

It will be hereby assumed that the diameter of the sun roller 3 is $d_1$, its number of revolutions is $n_0$, the diameter of the larger outer diameter portion 5 of the planetary roller 3 is $d_2$, the diameter of the contact portion of the smaller outer diameter portion 6 is $d_3$, the inner diameter of the contact portion of the exterior rings 4, 4' is $d_4$ and its number of revolutions is n, and that the sun roller, the planetary roller, the exterior rings and the low speed shaft can rotate freely for convenience sake. When the respective numbers of revolutions are expressed under this assumption, the relation in the first row of the following table can be obtained. The relation necessary for making the number of revolutions of the exterior rings 0 (zero) is listed in the second row. The reduction ratio R can be obtained by calculating the ratio between the number of revolutions of the sun roller and that of the low speed shaft from the result of the sum of the first and second rows.

| | Sun roller | planetary roller | exterior ring | low speed shaft |
|---|---|---|---|---|
| assumed number of revolutions | $n_0$ | $-\frac{d_1}{d_2} n_0$ | $-\frac{d_1}{d_2} n_0 \frac{d_3}{d_4}$ | 0 |
| to make rpm of exterior ring 0 | | $+\frac{d_1}{d_2} n_0 \frac{d_3}{d_4}$ | $+\frac{d_1}{d_2} n_0 \frac{d_3}{d_4}$ | $+\frac{d_1}{d_2} n_0 \frac{d_3}{d_4}$ |
| | $n_0 + \frac{d_1 d_3}{d_2 d_4} n_0$ | | 0 | $+\frac{d_1 d_3}{d_2 d_4} n_0$ |

In other words, the reduction ratio R is given by:

$R$ = number of revolutions of low speed shaft/number of revolutions of sun roller = $d_1 d_3 / (d_2 d_4 + d_1 d_3)$ Assuming that $d_1 = 10$ mm, $d_2 = 45$ mm, $d_3 = 25$ mm and $d_4 = 80$ mm in order to easily calculate R, $R = 1/15.4$.

Accordingly, the reduction ratio as high as 1/20 that has not been accomplished conventionally by the single-stage planetary gear mechanism having three planetary gears can be obtained in accordance with the present invention and drastic reduction can be accomplished as can be understood from the above.

Figure 5:
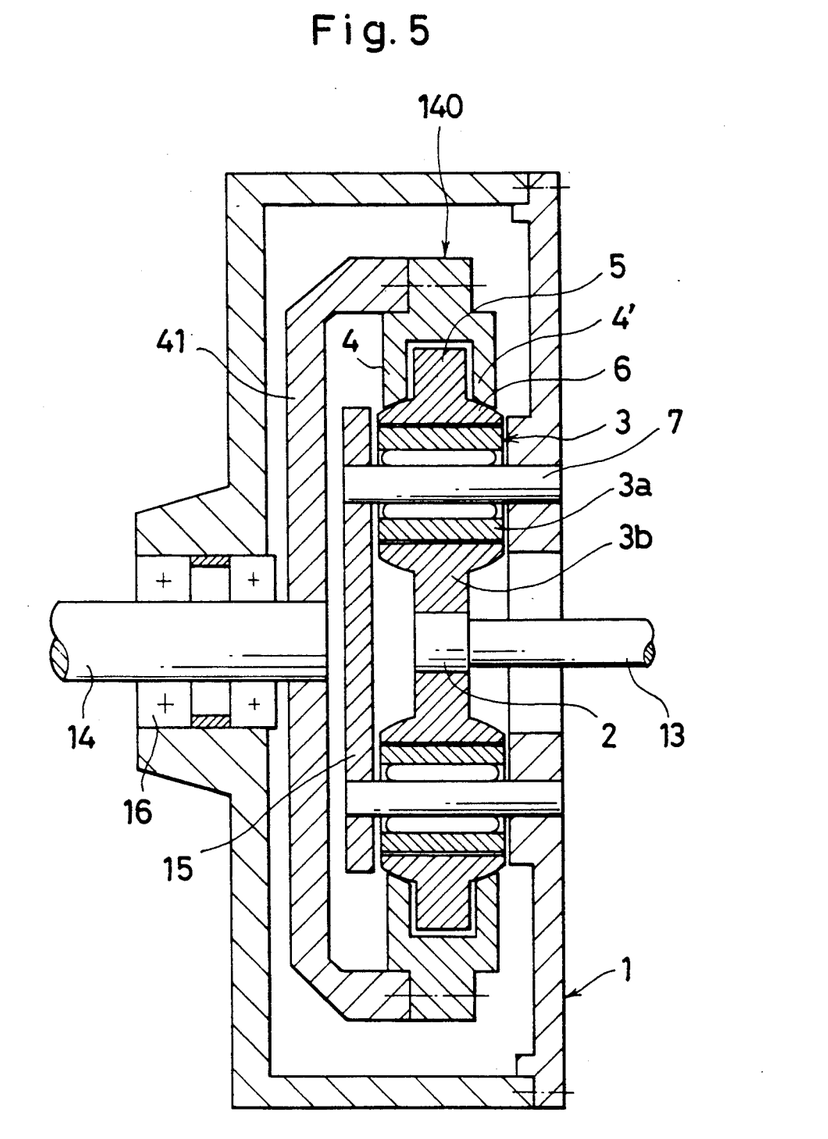
FIG. 5 is a longitudinal sectional view showing still another embodiment of the present invention.

FIG. 5 shows still another embodiment of the present invention.

Although similar to the afore-mentioned first embodiment wherein the planetary roller mechanism is of the star type, this embodiment does not dispose the hydraulic mechanism as the pushing mechanism for the planetary and sun rollers but utilizes the thermal shrinkage force of the exterior rings 4, 4' of their own.

In FIG. 5, the exterior rings 4, 4' are constituted integrally with the exterior ring portion 140 and the inner diameter at the contact portions of the inner periphery of the exterior rings 4, 4' is formed in such a manner as to be somewhat smaller than the diameter at the contact portion of the circumscribed circle of the small diameter portions 6 of the three planetary rollers 3. The exterior ring portion 140 for forming such exterior rings 4, 4' is heated and expanded at the time of the assembly of the planetary roller mechanism so that the inner diameter at the contact portions of their inner periphery is greater than the diameter at the contact portions of the circumscribed circles of the small outer diameter portions of the three planetary rollers 3, is fitted outside the three planetary rollers 3 assembled to the outer periphery of the sun roller 2 and is then cooled to normal temperature for shrinkage. Due to this shrinkage force, the inner peripheral slope surfaces of the exterior rings 4, 4' push strongly the small outer diameter portions 6 of the planetary roller 3 in the radial direction towards the axis of the sun roller 2 when the exterior ring portion 140 undergoes thermal shrinkage, and bring the larger outer diameter portion 5 of each planetary roller 3 into pressure contact with the sun roller 2.

Therefore, the extreme pressure occurs at the contact portion of each roller in the presence of the oil in the same way as in the first embodiment and a large traction force is generated. Since the planetary roller 3 is divided concentrically into the two segments, i.e. the roller portion 3a and the ring portion 3b, no push force is applied to the planetary shaft 7.

Figure 6:
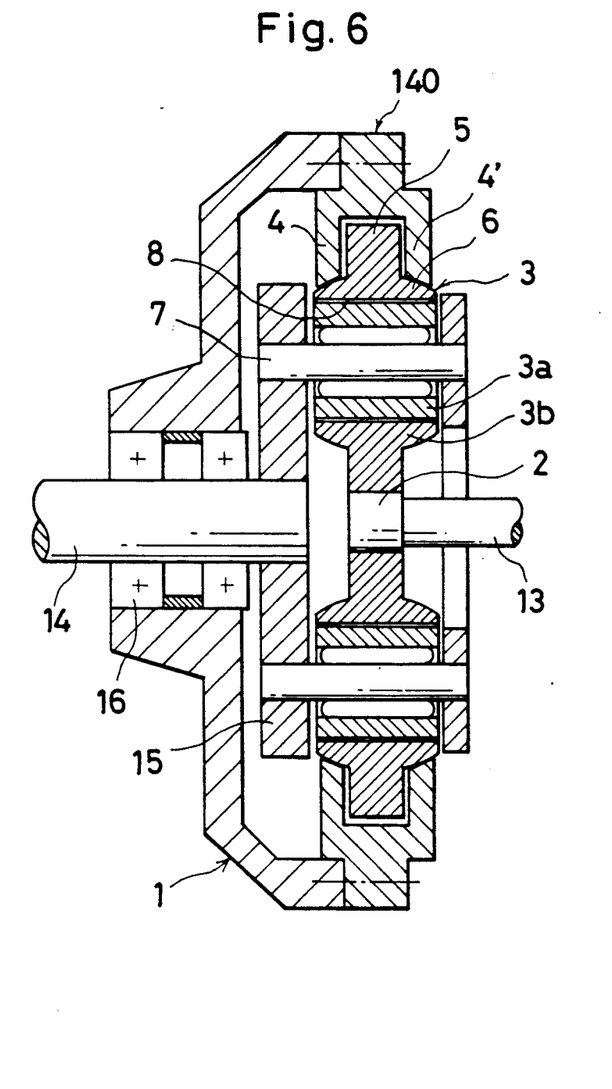
FIG. 6 is a longitudinal sectional view showing still another embodiment of the present invention.

FIG. 6 shows still another embodiment of the present invention.

Although similar to the second embodiment described above wherein the planetary roller mechanism is of the planetary type, this embodiment does not provide the hydraulic mechanism as the push mechanism for the planetary roller and the sun roller but it utilizes the thermal shrinkage force of the exterior rings 4, 4' in the same way as in the third embodiment described above.

In the same way as in the third embodiment, the slope surfaces of the inner periphery of the exterior rings 4, 4' push the small outer diameter portion 6 of each planetary roller 3 in the radial direction towards the axis of the sun roller 2 by means of the shrinkage force of the exterior ring portion 140 when it undergoes thermal shrinkage, and the extreme pressure is generated at the contact portion of each roller in the presence of the oil. No push force is applied to the planetary shaft due to the two-split structure of the planetary roller.

Figure 8:
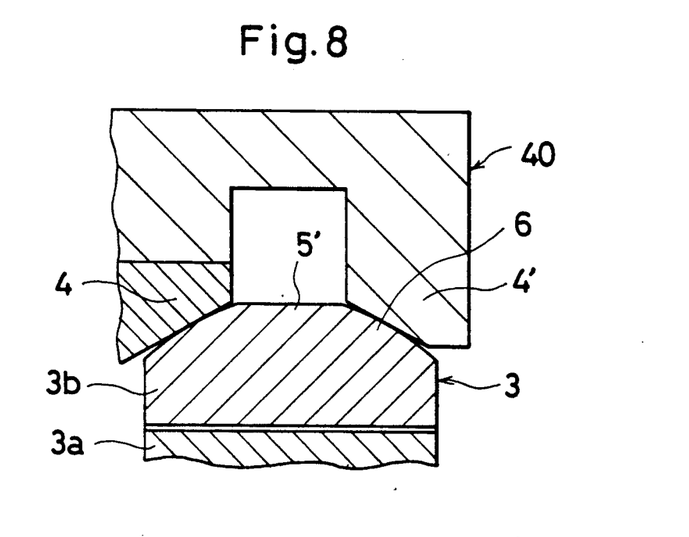
FIG. 8 is a longitudinal sectional view showing the principal portions of still another embodiment of the present invention.

In the embodiments described above, the shape of the ring portion 3b of each planetary roller 3 is stepped to provide the larger outer diameter portion 5 and the smaller outer diameter portions 6 in order to obtain a high reduction ratio. However, where such a high reduction ratio is not necessary, the ring portion 3b of the planetary roller 3 need not be provided with the larger outer diameter portion 5 as shown typically in FIG. 8. In other words, the outer diameter portion 5' which is brought into pressure contact with the sun roller 2 may have a size approximate to that of the small outer diameter portion 6.

Although all the embodiments described above explain the case of the reduction device, the present invention can be employed as an over-drive device by using the low speed shaft as the input shaft and the high speed shaft as the output shaft.

As described above, since the present invention uses the planetary roller mechanism having a specific shape and generates the extreme pressure in accordance with the tribology theory at the contact portion of each of its rollers so as to generate the large frictional force. Accordingly, power of the ultra-high speed revolution can be transmitted efficiently at a high reduction ratio. Moreover, since the present invention does not use gears and is constituted by the rollers as the basic units, it does not generate any machining error such as the error of gear machining and can make smooth speed change without causing vibration even in the case of power of the ultra-high speed revolution as high as some dozens of thousands of revolutions per minute.

What is claimed is:

1. A traction type transmission characterized in that a planetary roller mechanism is constituted by a sun roller, a plurality of planetary rollers disposed equidistantly around said sun rollers and exterior rings disposed outside said plurality of planetary rollers; said sun roller is coupled to a high speed shaft while either said exterior rings or planetary shafts supporting said planetary rollers are connected to a low speed shaft; each of said planetary rollers is divided concentrically into a roller portion on the side of said planetary shaft and a ring portion on the outer peripheral side with a gap between them; said ring portion is pushed strongly to the outer periphery of said sun roller in the presence of an oil; and two right and left slope surfaces of the inner periphery of said exterior ring is strongly pressed to both shoulder portions of the outer periphery of said ring portion in the presence of the oil, respectively.

2. A traction type transmission according to claim 1, wherein one of the slope surfaces of said exterior ring is formed on the edge surface of a hydraulic piston fitted idley to a hydraulic cylinder and said hydraulic piston is allowed to move freely in an axial direction towards one of both shoulder portion of said ring portion.

3. A traction type transmission according to claim 1, wherein the inner diameter at the contact portion of the slope surface of said exterior ring is made to be somewhat smaller than the diameter at the contact portion of a circumscribed circle with respect to the shoulder portions of said plurality of planetary rollers, and said exterior ring is fitted over the outer periphery of said shoulder portions under thermal expansion and is thereafter cooled to normal temperature for shrinkage so as to generate a strong pressing force in a radial direction.

4. A traction type transmission according to claim 1, wherein said ring portion of each of said planetary rollers has a larger outer diameter portion and smaller outer diameter portions on both sides of said larger outer diameter portion; said larger outer diameter portion is strongly pressed to the outer periphery of said sun roller in the presence of an oil; said two slope surfaces of the inner periphery of said exterior ring are strongly pressed to the outer periphery of said smaller outer diameter portions on both of the right and left sides in the presence of an oil; one of said slope surfaces is formed on the edge surface of a hydraulic piston fitted idley to a hydraulic cylinder; and said hydraulic piston is allowed to move freely in an axial direction towards said smaller outer diameter portions.

5. A traction type transmission according to claim 1, wherein the ring portion of each of said planetary rollers has a larger outer diameter portion and smaller outer diameter portions on both right and left sides of said larger outer diameter portion; said larger outer diameter portion is strongly pressed to the outer periphery of said sun roller in the presence of an oil; said two slope surfaces of the inner periphery of said exterior ring are strongly pressed to the outer periphery of said smaller outer diameter portions on both right and left sides in the presence of an oil, respectively; the inner diameter at the contact portion of said slope surface of said exterior ring is somewhat smaller than the diameter at the contact portion of a circumscribed circle with respect to said smaller outer diameter portion of said ring portion of each of said planetary rollers; and said exterior ring is fitted over the outer periphery of said smaller outer diameter portions under thermal expansion and is thereafter cooled to normal temperature for shrinkage so as to generate a push force in a radial direction.

* * * * *